May 6, 1930. J. P. BERTRAM ET AL 1,757,036
EYEGLASS GUARD
Filed Nov. 24, 1928
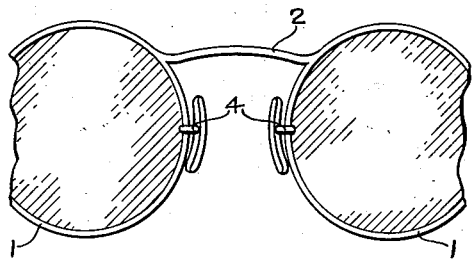
Fig.1
Fig.2
  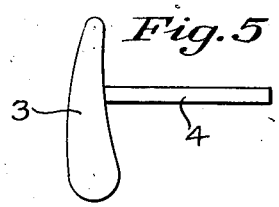 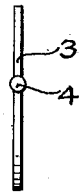
Fig.3　Fig.4　Fig.5　Fig.6
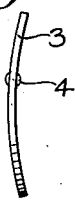 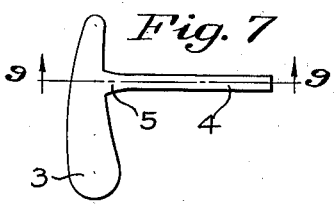 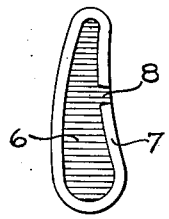 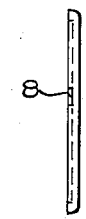
Fig.8　Fig.7　Fig.10　Fig.11
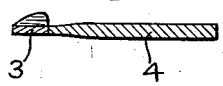
Fig.9
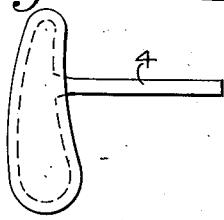  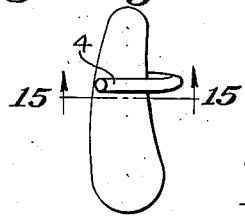 
Fig.12　Fig.13　Fig.14　Fig.15
INVENTORS
Jacob P. Bertram
Ivar Sundstrom
BY
Harold E. Stonebraker
THEIR ATTORNEY Patented May 6, 1930

1,757,036

UNITED STATES PATENT OFFICE

JACOB P. BERTRAM AND IVAR SUNDSTROM, OF ROCHESTER, NEW YORK, ASSIGNORS TO SHUR-ON STANDARD OPTICAL COMPANY, INC., OF GENEVA, NEW YORK, A CORPORATION OF NEW YORK

EYEGLASS GUARD

Application filed November 24, 1928. Serial No. 321,696.

The invention relates to eyeglasses with more particular reference to the type involving ear engaging temples and rigidly mounted nose guards, and has for its chief purpose to afford a construction of guard and method of manufacturing that enables producing a guard with an exterior surface entirely of zylonite, and such as to provide a practicable, durable, and attractive, neat appearing construction.

Some eyeglass guards have heretofore been constructed of precious metals, such as white gold, and a serious objection to this form is that after continued wear, the acids of the human body affect the metal, causing the surface to wear off or tarnish and become unsightly in appearance as well as unsanitary and dangerous to the user.

Other forms of nose guards have employed zylonite or composition facings riveted or otherwise attached to metal backs, but these have had the objection that the facing becomes loose, the rivets or metal attaching means become discolored and unsanitary, and the guard cannot be bent to different shapes.

A purpose of this invention is to afford a method that permits of producing a rigidly mounted nose guard with its entire exposed surface both front and back formed of zylonite, and so constructed as to permit bending or shaping the guard to fit it to any shape of nose.

It is well known that zylonite can be shaped when heated, and that if bent in a cold state is likely to chip or break, and one of the essential accomplishments of this invention is to so construct a zylonite guard that it can be bent to any desired shape without danger of breaking the zylonite and also without any likelihood of the zylonite returning to its original shape when the pressure is removed.

Another purpose of the invention is to apply zylonite facings to both the front and back of a metal pad of an eyeglass nose guard and to so relate and attach the facings around the metal pad that the latter is entirely enclosed and yet serves to hold the zylonite casing in any adjusted shape to which the guard may be bent.

An additional purpose of the invention is to afford a process that permits of successfully mounting a zylonite pad on a metal supporting arm of rounded cross-section so that the arm can be readily bent at any desired point to properly adjust the guard with reference to the lens as frequently necessary in the practical manipulation and application by an optician of eyeglasses to a person.

To these and other ends, the invention consists in the method and construction that will appear clearly from the following description when read in conjunction with the accompanying drawings, the novel features being pointed out in the claims following the specification.

In the drawings:

Figure 1 is a rear elevation of an eyeglass frame with one embodiment of the invention incorporated therein, the temples and ends of the lens frames being broken away to show the guard construction more clearly;

Figure 2 is a top plan view of the structure shown in Figure 1 with a portion of the bridge broken away to show the connection between a lens frame and guard arm;

Figure 3 is a view in elevation of a metal pad such as used in constructing the guard;

Figure 4 is a side elevation of the wire blank from which the guard supporting arm is initially formed;

Figure 5 is a side view of the arm after attachment to the pad;

Figure 6 is an edge elevation of the structure shown in Figure 5;

Figure 7 is a view similar to Figure 5 after bending the pad and flattening the arm where it joins on to the pad;

Figure 8 is an edge view of the structure shown in Figure 7;

Figure 9 is a sectional view on line 9—9 of Figure 7;

Figure 10 is an elevation of one of the zylonite facings;

Figure 11 is an edge elevation of the same;

Figure 12 is a side elevation of the structure after attachment of the zylonite facings around the metal pad;

Figure 13 is an edge elevation of the structure shown in Figure 12;

Figure 14 is a view similar to Figure 12 after the arm is bent to proper shape for attachment to a lens rim, and

Figure 15 is a sectional view on line 15—15 of Figure 14.

The invention is shown as applied to an eyeglass or spectacle frame employing the usual ear engaging temples, which are omitted for clearness, and nose guards rigidly mounted on the lens rims 1, which are connected by a bridge 2.

According to a preferred plan of procedure, the guard is constructed by cutting a flat pad 3 from a blank of suitable metal, the metal pad being of the same shape as that desired for the finished guard although of slightly less area, and 4 designates a wire rod of rounded cross-section which is to constitute the arm that is rigidly connected to the lens rim 1 and carries the guard. The arm 4 is rounded in order to permit ready application of a bending tool at any part for shaping the arm in a finished frame so as to adjust the latter to the nose. The rounded arm 4 is rigidly attached at one end to an edge of the metal pad 3 by soldering, welding, or in any other suitable way, resulting in the unit illustrated in Figures 5 and 6.

The finished guard is usually curved endwise and the next step in the process is to subject the metal pad 3 and arm 4 to bending dies or other suitable pressure applying means so as to bend the pad 3 endwise as shown in Figure 8, and preferably at the same time compress or flatten the arm 4 at the point 5 where it joins on to the metal pad 3, the purpose for which will appear presently.

The metal unit comprising the pad 3 and arm 4 is now ready to have the desired covering applied to it and for this purpose it is preferable to form a pair of facings of zylonite or similar substance. These facings are constructed as shown in Figures 10 and 11, each being of the same conformation as the metal pad 3, and of but slightly greater area. Each of the zylonite facings is preferably recessed on one side as at 6, such recess being of a shape to exactly receive the metal pad 3 and bounded by the shoulder 7 which latter is recessed at 8 to accommodate the arm 4. By flattening the latter at 5, as already described, a close fit is made possible between the arm and the surrounding edges of the zylonite facings.

Preferably both front and back zylonite facings are recessed as described, the shoulder 7 being only of sufficient width to insure firm attachment between the edges of the facings, and thus to completely encase the metal pad. With the zylonite facings constructed as described, they are positioned on the front and back of the metal pad 3 in the manner shown in Figures 12 and 13, heat and pressure being applied to bring about a uniform adherence between the contacting outer surfaces of the zylonite facings around the edge of the metal pad or backing. Where desired or necessary, cement may be applied between the adjacent surfaces 7 of the zylonite facings, although usually these can be efficiently united by application of heat and pressure only. While it is preferred to recess both zylonite facings as shown, if desired, the pad receiving recess may be formed entirely within one of the zylonite facings, or the latter can be otherwise constructed without departing materially from the fundamental contemplated accomplishment.

When the zylonite facings have been thus applied and united, the metal pad 3 is entirely encased both front and back and around its edges within a zylonite covering, except where the supporting arm 4 extends through. Owing to the fact that the metal body 3 is of the same shape and nearly as large as the zylonite covering, the guard with a complete zylonite covering can be bent as desired to shape any nose, with the assurance that the metal base or pad 3 will always retain the zylonite facings in the shape to which they are bent. The stiffness of the metal pad 3 is sufficient to prevent the zylonite from returning to its original shape, and owing to the metal pad 3 conforming completely to the shape of the zylonite facings and being of nearly as great area as the latter, any likelihood of the zylonite chipping or cracking is reduced to a minimum. The guard consequently can be bent or shaped while cold as easily, safely, and practicably as the usual all-metal guard.

When the structure is completed, as shown in Figures 12 and 13, the arm 4 is shaped as shown in Figures 14 and 15, and is ready to have its free end soldered or otherwise attached to the lens rim 1. Owing to the rounded cross-section of the arm 4, it can be easily gripped by an optician's bending tool at any point, the same as with the ordinary all-metal frame. The arm is rigidly connected to the guard and the zylonite casing affords an attractive housing that fits closely against the outer surface of the supporting arm, thus combining into a single structure the desirable features and advantages of a solid zylonite guard with the equally important advantages of an all-metal guard.

By the term "zylonite", as used throughout the specification and claims, is meant celluloid or other compositions or materials having characteristics and properties similar to what is commercially known as "zylonite".

While the invention has been described with respect to certain definite procedure and a specific construction, it is not confined to the details herein set forth, and this application is intended to cover any modifications or changes coming within the method disclosed and intent of the improvements, or the scope of the following claims.

We claim:

1. In a spectacle, the combination with a frame, and an elongated flat metal pad having free ends and fixedly mounted on the frame by means of an arm of relatively small cross section, of a zylonite covering over the front, back and edges of the pad except where the arm is connected thereto, the covering being so supported on the pad as to permit endwise bending of the pad and covering.

2. In a spectacle, the combination with a frame and an elongated flat metal pad having free ends and bent along its longitudinal axis to form a convex nose-engaging surface, and an arm secured to a lateral edge of the pad and rigidly connecting it to the frame, of zylonite facings completely encasing said pad except where the arm is secured thereto, said facings being of the same conformation as the pad and supported thereon so as to be free from the pad whereby the facings and pad may be bent to conform to the shape of the nose and the pad retain the zylonite in the shape given it.

3. In a spectacle, the combination with a frame, and an elongated flat metal pad having free ends and bent along its longitudinal axis to form a convex nose-engaging surface, and an arm secured to a lateral edge of the pad and rigidly connecting it to the frame, of zylonite facings completely encasing said pad except where the arm is secured thereto, said facings being attached to each other at their edges around the pad and supported free from the pad whereby the facings and pad may be bent to conform to the shape of the nose and the pad will retain the zylonite in the shape given it.

In witness whereof, we have hereunto signed our names.

JACOB P. BERTRAM.
IVAR SUNDSTROM.